Oct. 18, 1927.  
K. L. HERRMANN  
HOBBING MACHINE  
Filed Nov. 15, 1923   3 Sheets-Sheet 1

1,645,597

INVENTOR
KARL L. HERRMANN
BY
P. M. Pomeroy
ATTORNEY

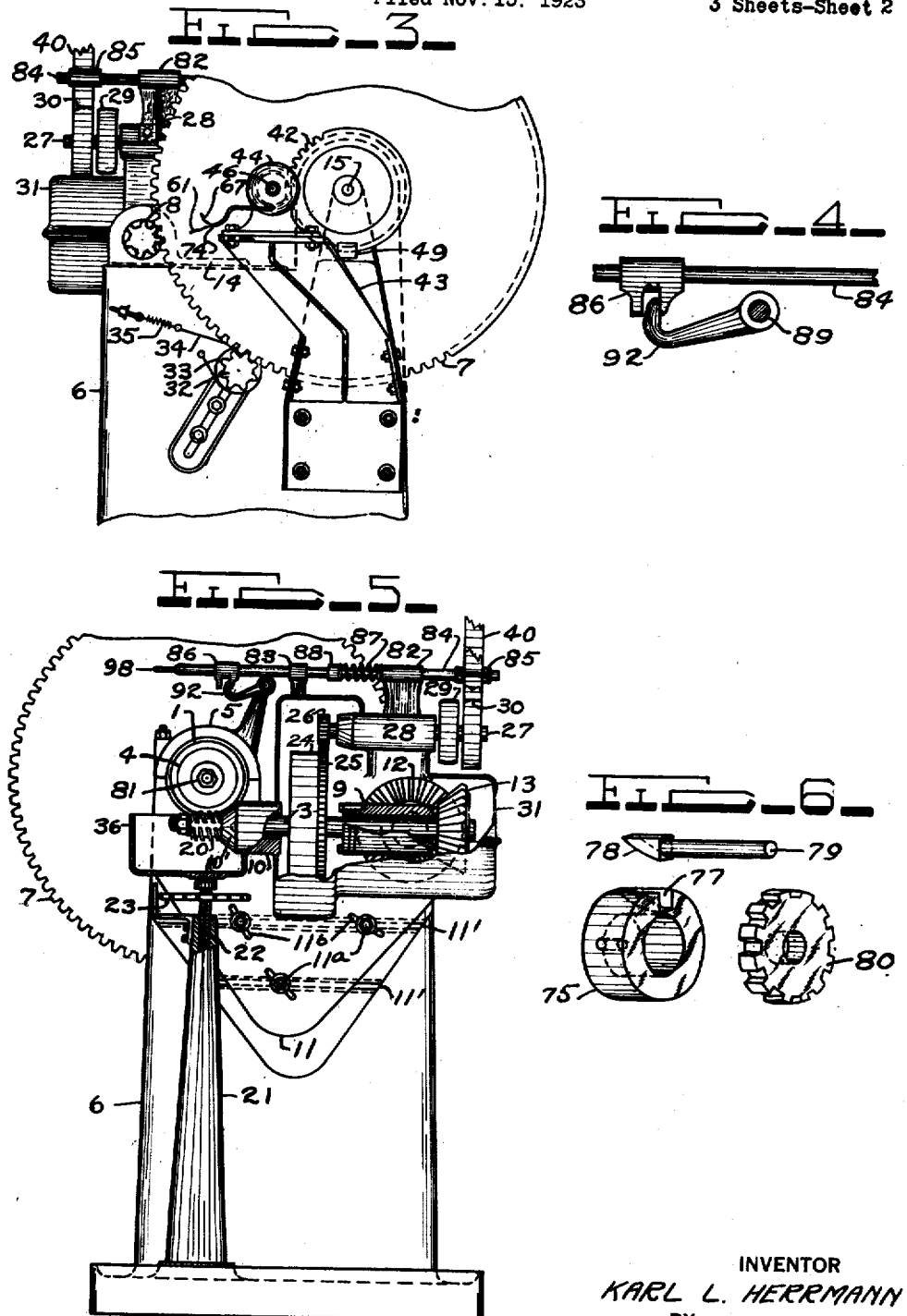

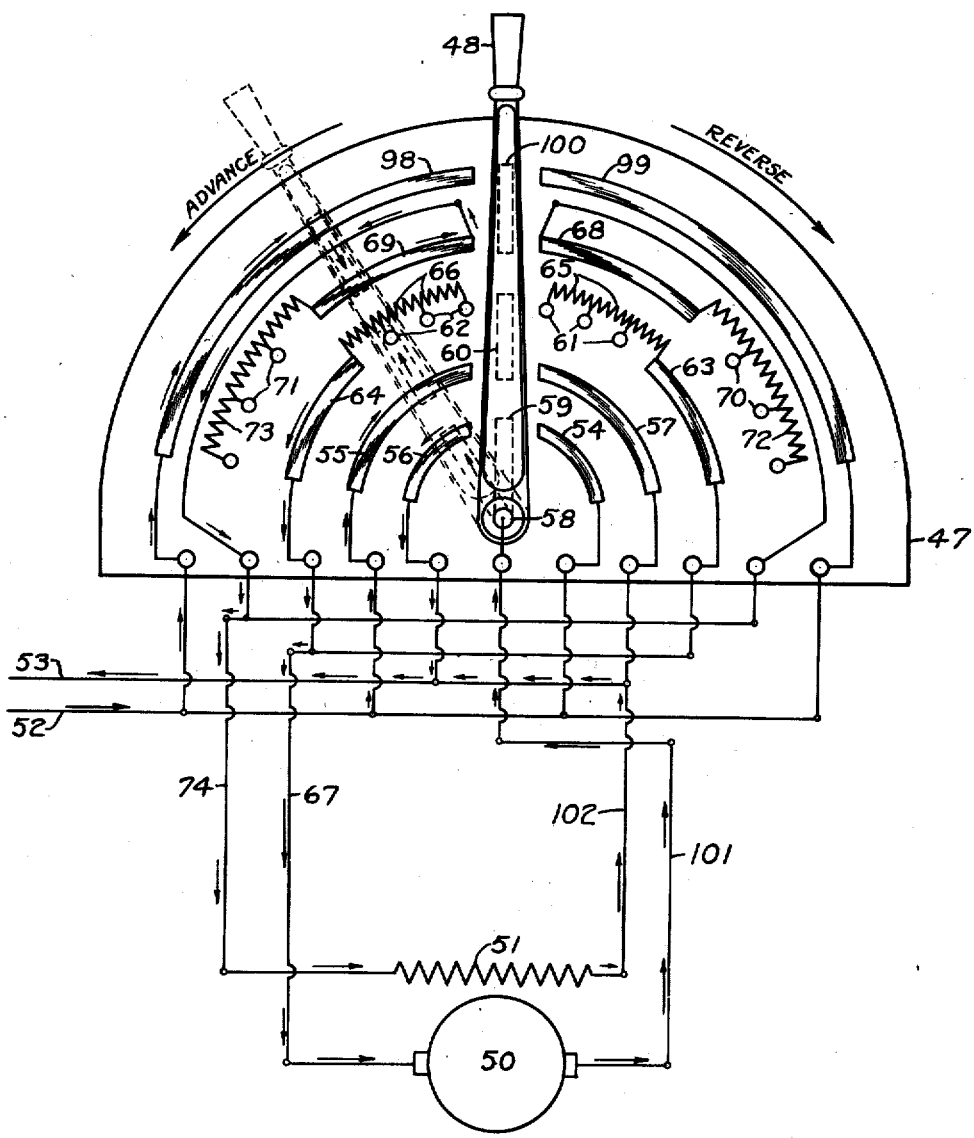

Patented Oct. 18, 1927.

1,645,597

UNITED STATES PATENT OFFICE.

KARL L. HERRMANN, OF DETROIT, MICHIGAN, ASSIGNOR TO THE STUDEBAKER CORPORATION, OF SOUTH BEND, INDIANA, A CORPORATION OF NEW JERSEY.

HOBBING MACHINE.

Application filed November 15, 1923. Serial No. 674,970.

This invention relates to improvements in gear cutting machines and more particularly to that class of machines known as hobbing machines which employ a spirally toothed hob or cutter, and in which both the work and cutter rotate simultaneously, and make it possible to cut several teeth at the same time, by a continuous cutting operation.

It is an object of this invention to provide a simple, quick and accurate means for positioning rough cut gears on the work arbor so that they will correctly match with the hob or cutter for the finishing operation.

It is another object of this invention to provide means for automatically stopping the machine on the completion of the cutting operation.

Another object of this invention is to provide means for stopping the work spindle in a predetermined position on completion of the cutting operation.

Still another object is to provide a pin on the index gear wheel of the machine which will engage belt shifting mechanism and stop the rotation of the work shaft when cutting the work has been completed, with the work shaft in a predetermined position.

A further object is to provide means for quickly returning the work spindle to loading position after the operation of cutting the work has been completed.

A still further object is to provide means for variably controlling the speed and direction of rotation of the feed screw of the machine.

Another object is to provide means for variably controlling the rate of feed or longitudinal movement of the work carrying spindle entirely independent of other movements of the machine.

The above and other objects will be apparent from the following description, reference being had to the accompanying drawings forming a part thereof, which show a suitable embodiment of my present invention.

In the drawings:

Figure 3 is a fragmentary rear view of the machine.

Figure 4 is a fragmentary view of part of the belt tripping mechanism.

Figure 5 is a partially broken fragmentary view showing the front of the machine.

Figure 6 is a view showing a rough cut gear and the means for positioning the same on the work arbor.

Figure 7 is a diagram showing the means for controlling the direction of rotation and speed of rotation of the feed motor.

Figure 1:
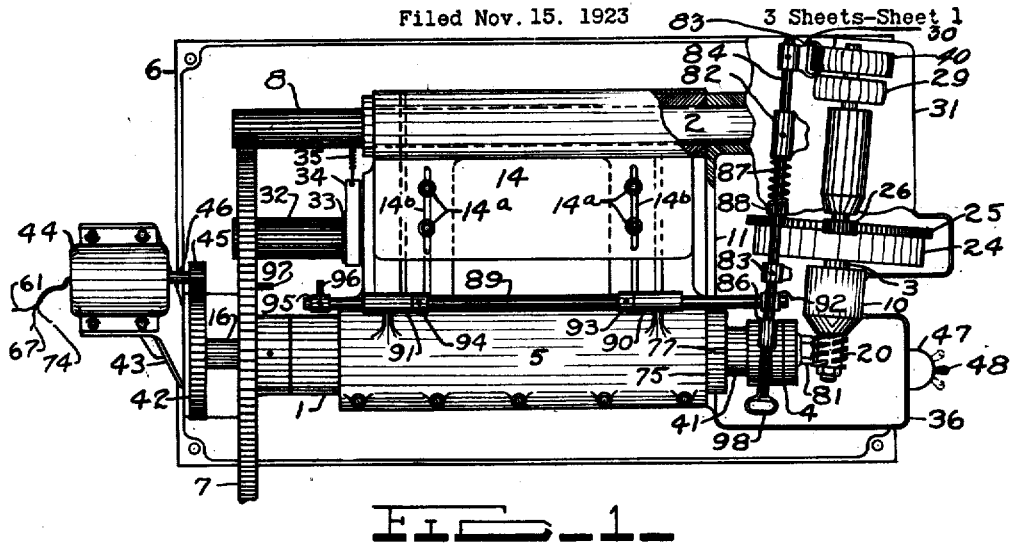
Figure 1 is a plan view of a hobbing machine having my present invention incorporated therewith.
Figure 2:
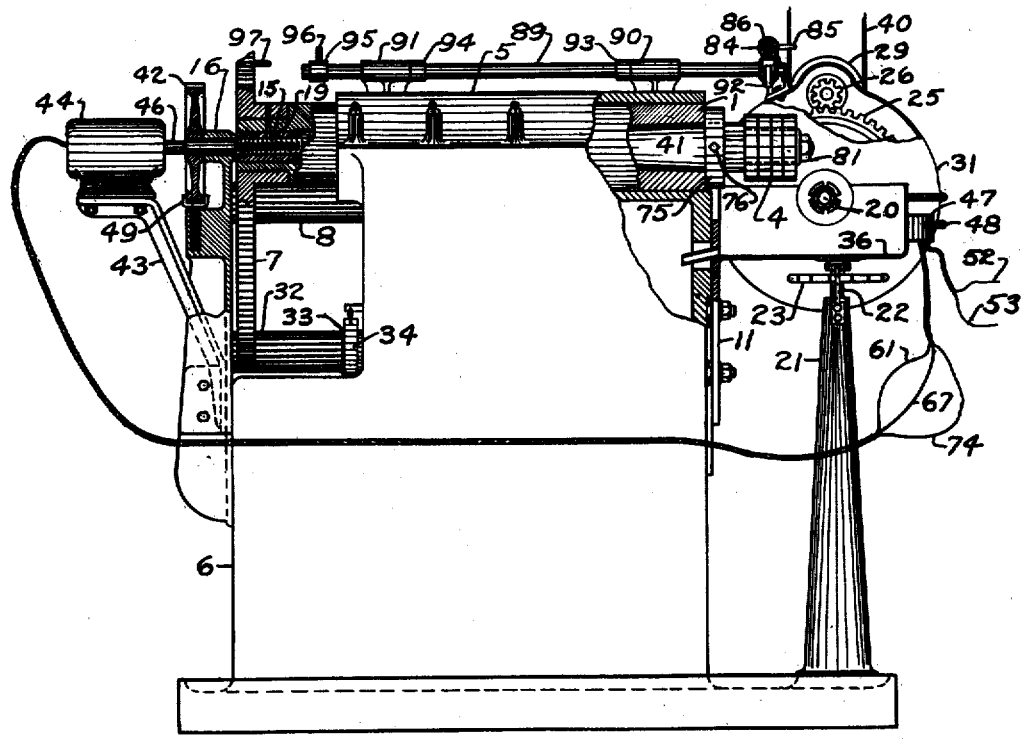
Figure 2 is a side view of the machine of Figure 1, certain parts being shown in section to more clearly define the invention.

The machine shown in the drawings, with the exception of those points covered by the present application, is the same as that shown in one of my previous applications on a "hobbing machine", filed March 2nd, 1923, Serial Number 622,297.

As illustrative of an embodiment of my invention, I have shown a plurality of connected shafts or spindles comprising a work carrying spindle or shaft 1, a transmission shaft 2 and a hob spindle 3, together with means for supporting, adjusting and driving the same. The work 4, such for example as gear blanks or rough cut gears, is supported on the arbor 41 in the end of the spindle 1 and is secured thereon against rotation by means of the nut 81 which holds the work between a shoulder on the mandrel 41 which is supported in the work spindle 1 and a washer interposed between the work and the nut. The work spindle 1, which is journaled in a long bearing 5 formed in a main frame 6, has a large index gear 7 secured thereto at the end opposite the work 4. The gear 7 is adapted to mesh with and move longitudinally along a long pinion gear 8 on the end of the transmission shaft 2 and is rotated thereby. A bevel gear 12 secured to the transmission shaft 2 at the end opposite the pinion gear 8 meshes with a bevel gear 13 secured to the hob shaft 3, which is journaled in bearings 9 and 10 carried by the bracket 11, the same being pivotally supported adjacent its one end on the transmission shaft 2. Because of this driving arrangement, the shafts or spindles 1, 2 and 3 are inter-connected and there is a definite ratio of rotation between the work spindle and the hob spindle and the same are rotated by driving means which will presently be described.

A flywheel 24 is secured to the hob spindle 3 intermediate the bearings 9 and 10 and may be of proper proportions to act as a counterbalance for the hob spindle 3 and thus cause an even rotation of the hob and prevent chattering of the same.

Any suitable driving means may be used to rotate the hob spindle and associated shafts and I have illustrated one of such means which may be applied for this purpose, which consists of a gear 25 formed on the flywheel 24 meshing with a pinion gear 26 on a shaft 27 journaled in the bearing 28 on the bracket 11. A loose pulley 29 and a pulley 30 fixed to the shaft 27 are provided on the outer end of the shaft 27 for driving the same. Power is supplied to the pulley 30 by the belt 40 which is connected to a suitable source of power such as an electric motor or power line shaft.

The transmission shaft 2 is supported by and journaled in a bearing member 14 which has a flat, horizontal face adapted to seat on a face formed on the main frame 6 and may be adjusted in a direction substantially at right angles to the work shaft 1 for a purpose to be described. It will be understood that it is at times desirable or necessary to change the ratio of rotation between the work shaft 1 and the hob spindle 3, and I accomplish such a change of ratio by changing the gears 7 and 8. In such a change of gears, there is usually a change in the combined pitch radii of the two gears, which is the distance between the centers of the work shaft 1 and the transmission shaft 2. This distance may be varied by adjusting the bearing member 14 to or from the work shaft 1 until the gears 7 and 8 are properly in mesh with each other. The bearing member 14 is then locked in adjusted position by the bolts 14$^a$ working in the slots 14$^b$ of the bearing member 14. In such a case it is not desirable or necessary that the gears 12 and 13 be changed.

A washer 10' is provided between the bearing 10 and the hob 20 to properly space the hob in cutting relation to the work 4. In substituting a new gear 7 of greater or smaller diameter to change the speed of the work shaft 1, the hob spindle 3 will be moved longitudinally when adjusting the bearing member 14, and a washer 10' of proper proportion can be substituted so that the hob 20 will always be positioned to act on the blanks to be cut.

Inasmuch as the bracket 11 is pivoted about the end of the transmission shaft 2 it must move to or from the work shaft 1 when the bearing member 14 is adjusted in position. Ways 11' in the adjacent face of the frame 6 receive flat headed bolts 11$^a$ which pass thru arcuate slots 11$^b$ and which receive suitable nuts for clamping the bracket 11 to the frame 6. When the bolts 11$^a$ are loosened the bracket 11 is free to move across the face of the frame 6 in accordance with the movement of the bearing member 14, and is also capable of a limited amount of pivotal movement around the center of the shaft 2 due to the bolts 11$^a$ sliding in the arcuate slots 11$^b$. This pivotal movement of the bracket 11 about the shaft 2 is to provide means for adjusting the hob 20 to or from the work 4, thus allowing gears of different diameters to be cut on the machine, or the use of hobs of different diameters. To assist in this adjustment, which of necessity must be very accurate, a pedestal 21 is provided, having a screw 22 and an indicating dial 23, the screw member 22 bearing against the under portion of a chip and oil pan 36 which is formed on the bracket 11 beneath the hob 20. Thus by turning the screw 22 by means of the indicating dial 23, the bracket 11 of which the pan 36 forms a part and which carries the hob spindle 3, may be accurately raised or lowered and adjustment will be indicated by the dial 23. After the hob 20 has been brought to the desired position the nuts on the bolts 11$^a$ are tightened and the bracket 11 is securely locked in such adjusted position.

When the machine is in operation, the hob spindle 3 and the transmission shaft 2 have no movement other than rotary, while the work spindle 1 has both rotary and axial movement, the same moving across the axis of the hob spindle, carrying the work 4 into contact with the hob 20. As has been described, rotation of any one of the three shafts, 1, 2 or 3 causes rotation of the other shafts. Axial movement of the work spindle 1 is obtained by means of a screw 15 held against longitudinal movement by the bearing 16, the screw 15 being threaded into the nut 19 secured within the work spindle 1. It will be evident that when the machine is in operation with the work spindle 1 rotating, if the screw 15 is not rotating, the work spindle 1 because of its rotary motion will move along the screw 15, thus feeding the work 4 into the hob 20. Inasmuch as the hob spindle 3 and the work spindle 1 are geared together through the transmission shaft 2, their ratio of rotation is constant, irrespective of any other movement of the machine. Thus, if the screw 15 is held stationary, there will be a constant definite advance of the work spindle 1 over the hob 20 for each complete revolution of the work spindle 1, the amount of advance or feed being dependent upon the pitch or lead of the screw 15.

As it is desirable to use different rates of feed on different work, or on different operations on the same work, it is desirable that means be provided to vary the rate of feed of the work spindle 1 across the hob 20. I have provided such means as follows:—On the rear end of the screw 15 I secure a gear 42. On a bracket 43 secured to the machine I mount an electric motor 44 which has a gear 45 mounted on its armature shaft 46, the gear 45 meshing with the gear 42 secured to the screw 15. Fastened to the chip pan 36 at the front of the machine convenient to the operator I place a control 47 for the motor 44, which is capable of controlling both the direction of rotation and the rate of rotation of the motor 44. Thus the operator, by manipulating the control handle 48 may vary the rate and direction of axial movement of the work spindle 1. For instance, if one load of work has just been finished, the operator may throw the control handle 48 to full reverse position which will quickly return the work spindle 1 to the loading position, at which time the handle 48 may be returned to neutral position, thus stopping the axial movement of the work shaft or spindle 1. The work 4 can then be removed and replaced by new work, after which the operator may throw the handle 48 to full advance position to bring the work 4 quickly up to cutting position, at which time the control handle 48 will usually be returned to neutral position. However, should the lead or pitch of the screw 15 be such as to provide too slow a feed for the particular work being done, the control handle 48 may be advanced to cause rotation of the screw 15 which together with the natural advance of the work spindle will result in the desired feed. Again, should the natural rate of feed of the work spindle 1 be too great for the particular work being cut, the control handle 48 may be moved into reverse to cause the screw 15 to rotate in the opposite direction and thus prevent an excessive rate of feed of the work spindle 1. Following this line of thought it is readily seen that the motor may be regulated to such a speed that the screw 15 is caused to rotate evenly with and in the same direction as the work spindle 1, at which time there would be no longitudinal movement of the work spindle although the machine as a whole would be correctly operating. It is further evident that a change of speed of the motor 44 from such a point either way will cause a change in the longitudinal movement of the work spindle 1 in a direction depending upon whether the motor 44 is speeded up or retarded. It is also further evident that by controlling the speed and direction of the motor 44 an almost endless range of feeds of the work spindle 1 may be obtained, utterly regardless of the operation of any other part of the machine. This, as is well known to those versed in the art, is an exceptionally desirable feature.

In order that there may be no possibility of the feed screw 15 turning inadvertently when the motor 44 is not turning I provide a shoe 49 which is resiliently pressed against the periphery of the gear 42. The friction between the shoe 49 and the gear 42 is not great enough to prevent the operation of the motor 44 but merely exerts enough drag on the gear 42 to prevent the screw 15 from turning due to the friction between the same and the nut 19.

In Fig. 7 I illustrate a suitable control device for varying the direction and rate of rotation of the motor 44 which in this case I have shown as a shunt wound motor. This is for the purpose of illustration only and it is evident that any type of suitable motor or control may be used in its place. As stated, for the purpose of illustration I show diagrammatically the motor 44 as a shunt wound motor having an armature 50 and a field 51. The control 47 makes use of the conventional practice of controlling the speed of such motors by varying the voltage of armature and field by introducing resistances in series with them, the voltage of the field being maximum for low speeds and the minimum for high speeds, and the voltage of the armature being minimum for low speeds and maximum for high speeds. For reversing the direction of rotation of the motor the direction of the current through the motor armature is reversed.

In the control shown, the control handle 48 is centrally disposed when in neutral position as shown in full lines of Fig. 7. Movement to one side of the central or neutral position varies the speed of rotation of the motor 44 in one direction and movement to the other side varies the speed of rotation in the other direction. The contacts for varying the voltage of the armature and field and for connecting the motor to a source of power are identically arranged, but in reverse position, on each side of neutral position of the control handle 48. In describing the mechanism of the control 47 it will be borne in mind that each half of the control 47 is identical with the other half except that the contacts are reversed in position and the two sets of lower contacts are wired in a reverse or opposite manner than those on the other side in order to lead the current through the motor armature in an opposite diection to the other side, so that the direction of rotation of the motor 44 may be reversed.

The source of power to the motor 44 is supplied by the two lines 52 and 53, the current being direct in this case and being considered as entering on the line 52 and leaving on the line 53. The line 52 runs to the strip contacts 54, 55, 98 and 99 and the line 53 runs to the strip contacts 56 and 57, all of which are circularly disposed about the point 58. It will be noted that the strip contacts 57 and 55 which are identically arranged on opposite sides of the neutral position are connected to different lines, and the same is true of the contact strips 54 and 56, but the contact strips 98 and 99 are both connected to the line 52.

The control handle 48 which is of non-conducting material and is pivoted at 58 to its support has a short contact strip 59 on its lower face extending from its pivot 58 outwardly therefrom a distance sufficient to contact with the strips 54 and 56. A second contact strip 60 is also secured to the under side of the handle 48, independent of and out of contact with the strip 59. The inner end of the strip 60 or the end nearest the pivot 58 is positioned from the pivot 58 commensurate with the distance of the contact strips 55 and 57 therefrom, and the outer end extends from the pivot 58 commensurate with the distance of the contact strips 63 and 64 therefrom. A third independent contact strip 100 is secured to the under side of the handle 48 still further removed from the pivot 58 than the contact strip 60, and is positioned from the pivot 58 commensurate with the distance of the contact strips 68 and 69 therefrom to a point commensurate with the distance of the contact strips 98 and 99 therefrom. A line 101 extends from the contact strip 59 to the right hand side of the armature 50 of the motor 44.

Above the strips 55 and 57 and arranged about the pivot 58 as a center are spaced contacts 61 and 62 which extend a short distance either side of the neutral position of the handle 48 to a point adjacent the contact strips 63 and 64. The contact points 61 are connected together and to the contact strip 63 by resistance coils 65, as are also the contact points 62 and contact strip 64 by the resistance 66, and the contact strips 63 and 64 are connected by the line 67 to the left hand side of the armature 50.

Above the points 61 and 62 and strips 63 and 64, and also arranged around the pivot 58 as a center, are contact strips 68 and 69 and contact points 70 and 71. These contacts are arranged in reverse position to those below them. In other words, the contact strips 68 and 69 start adjacent to neutral position of the handle 48 and extend away from it to a point adjacent the ends of the strips 63 and 64, from which point the contact points 70 and 71 extend in spaced relation. The contact strips 68 and the contact points 70 are connected together by the resistance 72, and the contact strip 69 and contact points 71 are connected together by the resistance 73. The contact strips 68 and 69 are both connected to the line 74 which is shown leading to the left hand side of the motor field 51, and a line 102 leads from the right hand side of the motor field to the line 53. This concludes the description of the wiring arrangement of the control 47.

To illustrate the manner in which the control 47 operates it will be considered that the handle 48 has been moved to the position shown in dotted lines of Figure 7. The current entering on the line 52 is led to both the contact strips 55 and 98. The current led to the contact strip 55 passes therethrough to the contact strip 60 on the lower side of the handle 48 and through the strip 60 to one of the contact points 62 and thence to the contact strip 64. Considering, first, the current entering one of the contact points 62, it will be evident that it must first pass through part of the resistance 66, dependent upon which contact point 62 the strip 60 contacts with, before it enters the strip 64, and such resistance 66 causes a drop in the voltage of the current passing therethrough. The current is led from the strip 64 through the line 67 to the left hand side of the armature 50, through the armature 50, through the line 101 to the strip 59, through the contact strip 56 and thence through the line 53 out. It is thus seen that the voltage across the armature is reduced from maximum because of the current passing through the resistance 66.

Considering now the current entering the strip 69 from the contact strip 98 and strip 100, it will be seen that it does not pass through any resistance in passing to the line 74 which leads to the field 51 of the motor 44 and thence to the line 102 to the line 53 and out. Thus the voltage across the field 51 is maximum and the voltage across the armature 50 is not maximum, a condition that is conventionally made use of for cutting down the normal speed of electric shunt wound motors. Now assuming that the handle 48 is moved over further from neutral position until the strip 60 is in contact with the strip 64 and the strip 100 is in contact with one of the contact points 71, then the voltage passing to the armature 50 is maximum and the voltage to the field 51 is less than maximum due to the resistance 73 which the current is caused to pass through before reaching the field 51 through the line 74. This reduces the magnetism of the field 51 and causes the motor to speed up. It will be evident that in the movement of the handle 48 from neutral position to full advance position, the voltage of the armature is increased from minimum to maximum while the voltage of the field remains constant at maximum, and after the maximum armature voltage is reached, the voltage to the field 51 is reduced from maximum to minimum upon further movement of the handle 48 while the voltage to the armature 50 remains constant at maximum. As the handle 48 is moved, the voltage of the armature 50 or the field 51 is changed with resulting change in the speed of the motor 44.

If the handle 48 is thrown over on to the opposite side of the control, or over to reverse position, then the current entering on the line 52 is led to the contacts 54 and 99. Because the current is thus led to the contact strip 54, it passes through the armature 50 by way of the contact strip 59 and line 101 in the opposite direction to which it passes when the handle 48 is on the opposite side of neutral position, or on advance, while the current passing to the field 51 through the strips 99 and 68 and line 74 passes therethrough in the same direction as it does when the handle is in advance position. Therefore, the direction of flow of the current through the armature, when the handle is in reverse position, is opposite to the direction of flow of the current when the handle is in advance position, while in either case the direction of flow of the current through the field 51 remains the same. Such reversal of the flow of the armature current and not of the field current acts to reverse the direction of rotation of the armature 50 as is readily understood by those familiar in the art. Inasmuch as the contacts are identically arranged in reverse order on both sides of neutral position, the speed of the motor 44 may be varied equally well in advance as in reverse. As before stated, this ability to vary the speed and direction of rotation of the motor 44 is adapted to control the speed and direction of the axial movement of the work shaft 1 of the hobbing machine with the resulting advantages.

Considering now the current entering the strip 69 from the strip 60, it will be seen that it does not pass through any resistance in passing to the line 74 which leads to the field 51 of the motor 44 and thence to the line 61. contact 59, contact strip 56 and out again. Thus the voltage across the field 51 is maximum and the voltage across the armature 50 is not maximum, a condition which is conventionally made use of for cutting down the normal speed of electric shunt wound motors.

Now assuming that the handle 48 is moved over further until the strip 60 is in contact with the contact strip 64 and one of the contact points 71. In such a case, the voltage passing to the armature 50 is a maximum and the voltage to the field 51 is less than maximum due to the resistances 73 which the current is caused to pass through before reaching the field 51. This reduces the magnetism of the field and causes the motor 44 to speed up. It will be evident that from neutral position to full advance position of the handle 48, the voltage to the armature 50 is increased from minimum to maximum while the voltage to the field remains at maximum, and after the maximum armature voltage is reached, the voltage to the field 51 is reduced from maximum to minimum while the armature voltage remains constant. As the handle 48 is moved, the voltage of the armature or the field is changed with a resulting change in the speed of the motor 44.

If the handle 48 is thrown over on the opposite side of the control, or over to reverse position, then the current entering on the line 52 is led to the contact 59 and leaves by the strip 57, thus causing the current to travel through the armature 50 and field 51 in a reverse direction to what it does when the handle 48 is on the advance side of neutral position, and therefore causes the motor 44 to revolve in the opposite direction to what it does when the handle 48 is on the advance side of neutral position. Inasmuch as all the contacts, except the lower two are identically arranged in reverse order on both sides of the neutral position, the speed of the motor 44 may be varied equally well in advance as in reverse. As before stated, this ability to vary the speed and direction of rotation of the motor 44 is adapted to control the speed of the axial movement of the work shaft 1 of the hobbing machine with the resulting advantages.

At the rear of the machine, a pinion gear 32 (see Figure 3) similar to the pinion gear 8 is adjustably mounted on the main frame 6 and is adapted to mesh with the gear 7. A drum 33 is formed on the gear pinion 32 near its journaled end and a brake or band 34 having its one end secured to the frame, extends around the drum 33 and is held under tension against the same by means of a spring 35 secured at its one end to the main frame 6 and at its other end to the free end of the brake 34. The band 34 exerting pressure on the drum 33 acts as a brake on the pinion 32, which in turn, acts as a brake on the gear 7 and the work shaft 1, to which the gear 7 is secured. This braking mechanism is provided to prevent the gear 7 from running away from the gear 8 and thus trying to drive it, which condition would, if there was sufficient back lash between the gears 7 and 8 and the bevel gears 12 and 13, cause a momentary irregularity in the ratio of rotation between the work spindle 1 and the hob spindle 3, thus resulting in irregularities in the work, and causing a change in shape of the gear teeth being formed, which would result in a faulty gear and a gear not suited for work where great accuracy is required.

In cutting gear teeth that must be very accurate, it is usually necessary to first rough cut them and then finish cut them. In such a case the finish cut requires a different adjustment of the hob if not an entirely different hob than the one used for the rough cut and usually the finish cut is made on a different machine, or on the same machine after a number of gears have been rough cut. In such cases it is evident that the space between the rough cut teeth on the gear must be lined up with the teeth on the hob, in order that the hob will properly match the gear and remove an equal amount of material from each side of two adjacent gear teeth. It will be seen that were the hob teeth and the spaces between the gear teeth not properly matched, the gear teeth would not be properly formed and in some cases might be entirely cut off.

I provide means for accurately matching rough cut gears with the hob, which comprises a collar 75 on the mandrel 41. The collar 75 is secured in position against rotation and axial movement on the mandrel 41 by the set screw 76 threaded therein, and has formed in its outer surface a notch 77 whose sides are preferably parallel with the axis of the collar 75. A gage member is provided comprising an end 78 adapted to accurately fit the notch 77 and an extension 79 adapted to fit between two adjacent teeth of a rough cut gear 80, as is clearly shown in Fig. 6.

One method of utilizing this means is to loosely place a finished cut gear on the mandrel 41, move the work shaft 1 with the mandrel 41 up to and in engagement with the hob and accurately match the finished cut gear with the hob 20 and then tighten the nut 81 to hold the finish cut gear in position on the mandrel. The work shaft 1 with mandrel 41 is then brought back to loading position and the end 78 of the gage is then inserted in the notch 77 of the collar 75 and the collar 75 is turned on the mandrel 41 until the end 79 of the gage accurately fits between two of the teeth on the finished cut gear. When the collar 75 is brought to this position the set screw 76 is tightened, thus securing the collar 75 to the mandrel 41. It is now apparent that if the finished cut gear is removed and replaced by a rough cut gear and the latter is positioned on the mandrel 41 in such a manner that the end 79 of the gage falls between two adjacent gear teeth and then is secured in position, when the rough cut gear 80 is moved into contact with the hob 20, the teeth of the hob 20 will be centrally positioned between the rough cut teeth of the gear 80. Inasmuch as the work shaft 1 and hob shaft 3 are constrained to rotate in a fixed ratio, it is evident that the position of the notch 77 in the collar 75 is at all times in the same relative position with respect to the teeth on the hob 20 and that the teeth of any gear so lined up by the gage end 79 when the opposite end 78 is seated in the notch 77, will accurately enter into proper engagement with the hob 20.

In order to facilitate the operation of accurately positioning rough cut gears on the work spindle for the finishing cut, it is desirable that when the machine is brought to rest for reloading, the work spindle 1 will automatically be in such a position that the notch 77 will be on the upper side, and will require no effort on the part of the operator to bring it to this position. It is also desirable to provide means for automatically stopping the operation of the machine as soon as the work has been finished. I have provided means whereby both of these features are incorporated together. These means may consist in mechanism for throwing the driving belt from the driving pulley to the loose pulley as soon as a piece of work has been finished in such a manner that the machine comes to rest with the notch 77 on the upper side of the mandrel 41. In bearings 82 and 83 supported by the bracket 11 I provide an axially movable shaft 84 positioned approximately parallel with and above the hob spindle 3. A belt engaging member 85 having an eye through which the belt 40 passes is secured at one end of the shaft 84. Near the other end of the shaft 84 I secure a member 86 having a downwardly extending notch. Around the shaft 84 is provided a spring 87 normally held under compression between the bearing 82 and collar 88 secured to the shaft 84. The normal tendency of the spring 87 is to move the shaft 84 into a position such that the belt 40 will be moved onto the loose pulley 29, thus stopping the operation of the machine. To prevent the belt 40 from being shifted over onto the loose pulley 29 when the machine is in the operation of actively cutting a gear, I provide a shaft 89 substantially parallel with and above the work shaft 1 and rotatably supported in bearings 90 and 91 mounted on the frame 6 above the work shaft 1, and on the end of this shaft adjacent the shaft 84 is secured a hook or finger member 92, the end of which is adapted to engage the notch in the member 86 and prevent axial movement of the shaft 84. Suitable collars 93 and 94 prevent axial movement of the shaft 89. At the rear end of the shaft 89 and adjustable thereon axially is secured a member 95 having an arm 96 which projects perpendicularly to the axis of the shaft 89. On the large index gear 7 secured to the rear end of the work shaft 1 a pin 97 is secured in such a position that when the index gear 7 has moved with the work spindle 1 forward a predetermined amount the pin 97 rotating with the gear 7 will engage the arm 96 and carry the same along with it, thus rotating the shaft 89 and causing the finger 92 to drop out of engagement with the notch in the member 86, allowing the spring 87 to move the shaft 84 axially, thereby shifting the belt 40 to the loose pulley 29 and stop the operation of the machine. The member 95 being adjustable axially along the shaft 89 makes it possible to so position it with regard to the axial movement of the work shaft 1 to which the index gear 7 carrying the pin 97 is secured that it will not be engaged by the pin 97 until the work carried by the mandrel 41 has completely passed over the hob 20. Inasmuch as the gear 7 turns relatively slow in comparison with the pulleys 29 and 30, it will not rotate a considerable amount after the belt 40 has been shifted to the loose pulley 29 and it is thus possible to so position the pin 97 on the gear 7 that when the machine is stopped the notch 77 will be on the upper side of the mandrel 41. It is thus evident that I have provided simple means for effecting two results, first, the automatic stopping of the machine when the machining of the work is completed, and second, automatically bringing the notch 77 to the upper side of the mandrel 41 when the machine comes to rest.

To illustrate the operation of the machine we will assume that a rough cut gear is being cut by or fed into the hob 20 and for simplicity of description we will consider that the feed screw 15 is not rotating during this operation. The belt 40, being driven by any suitable means causes the pulley 30 to rotate thereby rotating the gear 26 which in turn rotates the flywheel 24 and hob shaft 3. The hob shaft 3 is geared by the bevel gears 12 and 13 to the transmission shaft 2 which in turn is geared to the work shaft 1 by the gears 7 and 8. Obviously, then, the transmission shaft 2 and work shaft 1 are rotating with a fixed ratio in respect to the hob spindle 3. As the work spindle 1 rotates it moves forward along the screw 15, carrying with it the index gear 7 and pin 97. By the time the work 4 has completely passed over the hob 20 and the cutting operation is completed the pin 97 has moved far enough forward to engage the arm 96 which rotates the shaft 89 and drops the finger 92 out of contact with the notch in the member 86 which then allows the spring 87 to move the shaft 84 and belt engaging member 85 to shift the belt 40 over on to the loose pulley 29. The machine comes to rest when this is done, with the notch 77 on the upper side of the mandrel 41. The control lever 48 is then moved over to reverse position which rapidly returns the work spindle to loading position at which point the control handle 48 is returned to neutral position which stops the longitudinal movement of the work spindle 1. The nut 81 is then removed, the gear just "finish" machined is removed, and a rough cut gear such as 80 replaces it, the gage end 78 is placed in the notch 77 and the gear 80 is rotated until the gage end 79 seats properly in the space between two of the teeth of the gear 80. The nut 81 is then threaded home thus securing the rough cut gear in proper position on the mandrel 41 and the gage is removed.

The control handle 48 is then thrown into advance position which quickly brings the work up to operative engagement with the hob 20 at which point the control handle 48 is returned to neutral position. The handle 98 is then moved to throw the belt back onto the driving pulley 30 and to bring the finger 92 again into operative relationship with the notch in the member 86 and the cycle of operation is resumed.

It will be understood that the forgoing description and drawings are for the purpose of illustration only and that formal changes may be made in the specific embodiment of the invention described without departing from the spirit or substance of the broad invention, the scope of which is commensurate with the appended claims.

What I claim is:—

1. In a hobbing machine, a rotatable and axially movable work carrying spindle having a drive gear secured thereto, a belt shifting mechanism actuated upon a predetermined axial movement of said spindle for stopping rotatation of said spindle, and means on said drive gear for actuating said belt shifting mechanism.

2. In a hobbing machine, a rotatable and axially movable work carrying spindle having a gear secured thereto, means on said gear, and means engaged by said first means to automatically stop rotation of said spindle upon a predetermined axial movement of said spindle.

3. In a hobbing machine, a hob shaft and work shaft driven thereby, said work shaft having axial and rotatable movement, a driving pulley operatively connected to said hob shaft and a loose pulley positioned adjacent said drive pulley, a driving belt, a shifter shaft having belt engaging means thereon positioned axially parallel to said pulleys, resilient means tending to move said belt from said drive pulley to said loose pulley, a rotatable trigger shaft positioned parallel to said work shaft, a trigger on said trigger shaft normally engaging and preventing said shifter shaft from moving said belt onto said loose pulley, an arm on said trigger shaft, and means on said work shaft whereby when said work shaft has moved a predetermined distance axially, said arm on said trigger shaft will be engaged by said last named means, causing said trigger shaft to rotate and move said trigger out of engagement with said shifter shaft.

4. In a hobbing machine, a rotatable and axially movable work spindle, a rotatable hob shaft having a hob mounted thereon, constrained to rotate in a fixed ratio of rotation therewith, means independent of the rotation of said work spindle for variably controlling the direction and rate of axial movement of said work spindle, means including a member carried by said work spindle having a gage aligning portion for properly positioning a rough cut gear on said work spindle with respect to said hob, and means for automatically stopping said machine with said gage aligning portion of said member in a predetermined position.

5. In a gear cutting machine, the combination with an axially movable and rotatable work carrying spindle, means for rotating said spindle, a nut secured against rotation in said spindle, an axially immovable screw co-operating with said nut tending to impart a normal fixed rate of axial feed of said spindle, and means for imparting rotational movement to said screw to vary said normal rate of feed to effect a greater or lesser rate of feed of said spindle.

6. In a gear cutting machine, the combination with an axially movable and rotatable work carrying spindle, means for rotating said spindle, a nut secured in said spindle, an axially immovable screw co-operating with said nut tending to cause a normal fixed rate of axial feed of said spindle, and means for imparting rotational movement to said screw to superimpose upon said normal rate of feed of said spindle an additional rate of feed.

7. In a gear cutting machine, an axially movable and rotatable work carrying spindle, means for rotating said spindle, a nut carried by said spindle nonrotatable with respect thereto, an axially movable screw axially engaging said nut for imparting a normal rate of axial feed movement to said spindle, and actuating means independent of said spindle rotating means for variably controlling the rate and direction of rotation of said screw to superimpose upon said normal rate of axial feed of said spindle an additional feed reducing or increasing said normal rate feed, and for providing a quick return of said spindle to work loading position.

8. In a gear cutting machine, the combination of a work spindle and means for causing rotation and axial movement thereof, a primary axial feed for said spindle dependent upon rotational movement of said spindle, and a supplemental feed for said spindle dependent upon rotational movement of said screw.

9. In a gear cutting machine, the combination of a work spindle, a gear for causing rotation of said spindle, and means for causing axial movement thereof including a screw and a nut; a primary axial feed for said spindle dependent upon rotational movement of said spindle, a supplemental feed for said spindle dependent upon rotational movement of said screw, and means for variably controlling the rotational movement of said screw independently of said gear 10. In a gear cutting machine, the combination of a work spindle, means for causing rotation of said work spindle, means for imparting a primary axial feed movement to said spindle dependent upon rotation of said spindle comprising a nut carried by said spindle and a co-operating screw, and means for variably controlling said primary axial feed movement by rotational movement of said screw to superimpose upon said primary feed movement an additional feed movement.

11. In a hobbing machine, a work spindle, a hob constrained to rotate with a fixed ratio of rotation therewith, and means for positioning a partially cut gear on said work spindle whereby said partially cut gear may properly engage said hob, said means comprising a collar having a recess therein carried by said spindle, and a gauge having an end receivable in said recess and having an extended portion, a portion of said partially cut gear being adapted to be brought into line with said extending portion when said gauge is received in said recess whereby the teeth of said partially cut gear will be positioned to be correctly engaged between the teeth of said hob.

12. In a gear cutting machine, a work spindle having a gear mounted thereon and a cutter spindle operatively connected therewith to rotate with a fixed ratio of rotation in respect thereto, a cutter on said cutter spindle, a collar on said work spindle having a recess formed therein, and a gauge engageable with said recess and a portion of said gear to position said gear whereby the teeth of said cutter will be received between adjacent teeth of said gear.

13. In a hobbing machine, a rotatable work spindle axially movable by screw means, means for rotating said work spindle comprising a drive gear secured thereto, means for varying the direction and rate of said axial movement, a hob on a hob spindle, means for positioning a rough cut gear on said work spindle whereby the teeth thereof will be correctly engaged by said hob, and means carried by said drive gear for automatically actuating mechanism for stopping the movement of said work spindle when said spindle has moved to a predetermined axial position.

14. In a hobbing machine, a hob and a rotatable axially movable work spindle, a drive gear secured to said work spindle, means for controlling the rate direction of axial movement of said work spindle, means carried by said drive gear for actuating mechanism to stop said machine when said work spindle has advanced to a predetermined axial position and a predetermined rotatable position.

15. In a hobbing machine, a work spindle provided with a drive gear secured thereto, a hob constrained to rotate in a fixed ratio of rotation with said spindle, means for positioning a partially cut gear on said work spindle whereby the teeth thereof will be properly engaged with said hob, said means comprising a member carried by said work spindle and a gauge adapted to seat in a recess formed therein, and means carried by said drive gear for automatically actuating mechanism to stop said machine with said recess in a substantially predetermined position.

16. In a hobbing machine, the combination of a hob spindle having a hob mounted thereon, a longitudinally movable work spindle having a gear blank mounted thereon, a nut secured to said work spindle, a screw engaging said nut, means for rotating said work spindle to cause said nut to move along said screw and move said work spindle across said hob, and means independent of movement of said work spindle for variably controlling the rate and direction of rotation of said screw to control the rate and direction of feed of said work spindle across said hob.

17. In a hobbing machine having a rotatable longitudinally movable work spindle and a hob spindle rotatable in timed relation therewith, a nut nonrotatably secured to said work spindle, an axially immovable screw engaging said nut whereby rotation of said spindle imparts an axial feeding motion to said spindle, and a variable speed electric motor operatively connected to said screw for causing rotation thereof to modify said feeding motion of said work spindle.

Signed by me at South Bend, Indiana, U. S. A., this 12th day of November, 1923.

KARL L. HERRMANN.

positioning a partially cut gear on said work spindle whereby the teeth thereof will be properly engaged with said hob, said means comprising a member carried by said work spindle and a gauge adapted to seat in a recess formed therein, and means carried by said drive gear for automatically actuating mechanism to stop said machine with said recess in a substantially predetermined position.

16. In a hobbing machine, the combination of a hob spindle having a hob mounted thereon, a longitudinally movable work spindle having a gear blank mounted thereon, a nut secured to said work spindle, a screw engaging said nut, means for rotating said work spindle to cause said nut to move along said screw and move said work spindle across said hob, and means independent of movement of said work spindle for variably controlling the rate and direction of rotation of said screw to control the rate and direction of feed of said work spindle across said hob.

17. In a hobbing machine having a rotatable longitudinally movable work spindle and a hob spindle rotatable in timed relation therewith, a nut nonrotatably secured to said work spindle, an axially immovable screw engaging said nut whereby rotation of said spindle imparts an axial feeding motion to said spindle, and a variable speed electric motor operatively connected to said screw for causing rotation thereof to modify said feeding motion of said work spindle.

Signed by me at South Bend, Indiana, U. S. A., this 12th day of November, 1923.

KARL L. HERRMANN.

CERTIFICATE OF CORRECTION.

Patent No. 1,645,597. Granted October 18, 1927, to

KARL L. HERRMANN.

It is hereby certified that error appears in the printed specification of the above numbered patent requiring correction as follows: Page 5, line 33, beginning with the word "Considering" strike out all to and including the word "advantages" in line 88; and that the said Letters Patent should be read with this correction therein that the same may conform to the record of the case in the Patent Office.

Signed and sealed this 8th day of November, A. D. 1927.

Seal.

M. J. Moore,
Acting Commissioner of Patents.

CERTIFICATE OF CORRECTION.

atent No. 1,645,597.  Granted October 18, 1927, to

KARL L. HERRMANN.

It is hereby certified that error appears in the printed specification of the above numbered patent requiring correction as follows: Page 5, line 33, beginning with the word "Considering" strike out all to and including the word "advantages" in line 88; and that the said Letters Patent should be read with this correction therein that the same may conform to the record of the case in the Patent Office.

Signed and sealed this 8th day of November, A. D. 1927.

Seal.

M. J. Moore,
Acting Commissioner of Patents.